H. M. WELLS.
Stove Pipe Joint Fastener.
No. 229,506.        Patented June 29, 1880.
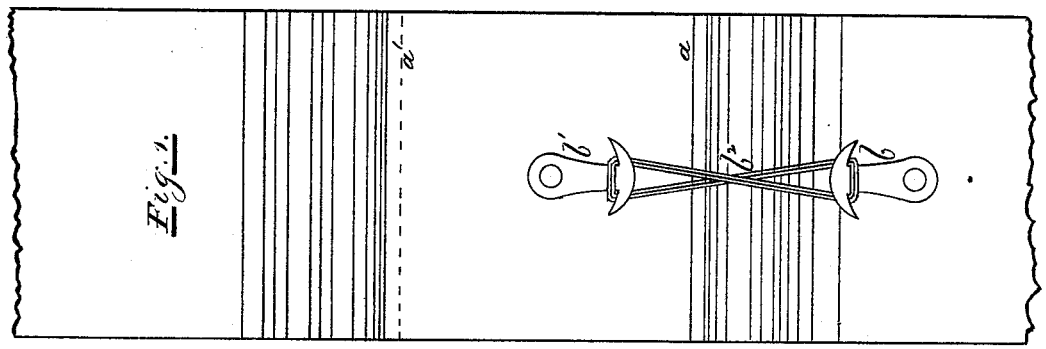
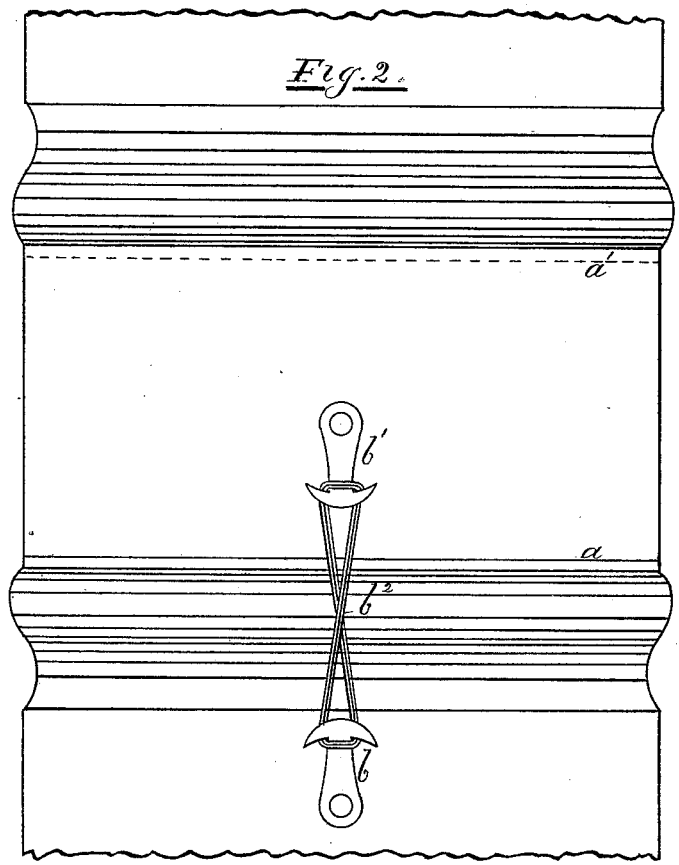
Witnesses
Henry Marshall Wells
Inventor
per William Gill
Atty

UNITED STATES PATENT OFFICE.

HENRY M. WELLS, OF TORONTO, ONTARIO, CANADA, ASSIGNOR OF ONE-HALF OF HIS RIGHT TO THOMAS RICHARD FULLER, OF SAME PLACE.

STOVE-PIPE-JOINT FASTENER.

SPECIFICATION forming part of Letters Patent No. 229,506, dated June 29, 1880.

Application filed February 18, 1880.

*To all whom it may concern:*

Be it known that I, HENRY MARSHALL WELLS, of the city of Toronto, in the county of York, in the Province of Ontario, Canada, have invented certain new and useful Improvements in Stove-Pipe-Joint Fasteners; and I do hereby declare that the following is a full, clear, and exact description of the same.

My invention relates to stove-pipe-joint fasteners for securing the pipes when in position, which I accomplish in a simple, inexpensive, yet thoroughly effective manner. I do not use any new construction of pipe or joint in the shape of a lock or catch or other such provision. I use the ordinary construction of stove-pipe, with the common and well-known joint of the same, having the said joints well and accurately made, fitting closely and easily, which can be done by any ordinary tradesman.

One of the principal uses of my fastener is for long ranges of horizontally-placed pipe, which prevents their drooping in the middle and out of line. It is also suitable for all other positions of pipe, when placed vertically, as well as when in a horizontal range.

It consists of an anchor-shaped hook, formed by punching out of the solid plate, and when placed on the pipe is held by one rivet. One of these is placed on each side of the joint, and a piece of small wire wound around them and connecting the same, and when so placed and connected by winding over the range of pipe, becomes in reality of one piece, and will remain good and tight for any length of time. The lengths will not be liable to be drawn apart from expansion when overheated, and will consequently be fire-proof and a thorough preventive of those numerous accidents which occur from faulty stove-pipes.

In the accompanying drawings the same letters of reference indicate the same parts as in this specification.

Figure 1 is a plan of my device, showing a portion of a stove-pipe—viz., a strip cut out longitudinally from the pipe—being sufficient to show the invention equally as well as if the whole pipe were shown. This figure shows the joint $a\ a'$ and the hooks $b\ b'$, hereinbefore referred to, and also the wire $b^2$.

Fig. 2 is an elevation of a stove-pipe, showing the full diameter of the pipe and the length of the joint, which latter is between the line $a$ and the dotted line $a'$, showing also the hooks $b\ b'$ and wire $b^2$. The hooks $b\ b'$ may be of other forms, or in the form of a knob or button, but preferably made in the form shown in the model, the wire not being liable to unwind from the hook $b$.

I sometimes use another modification in the construction of my fastener, consisting of a parallel strip of metal, and notched so as to catch on a pin on the opposite pipe, and is so notched as to secure the pipe, whether the joint be fully up or only partly up.

Stove-pipes placed in position with my device for fastening the joints could be put up and taken down when so required much more easily and expeditiously than when fitted up in the usual manner.

Fig. 3 represents the wire passed or wound over and held by two buttons, which may be used instead of the anchor-shaped hooks $b\ b'$.

I am aware that pipe-sections have been connected by means of a swinging hook, and also by means of an eyed clasp and a bolt, but in such way that the hook or bolt is liable to become loose and unfastened. Sheet-metal fastenings having a slot cut therein, and with a tongue-piece passing through such slot, and then doubled or bent backward, have also been made; but in such case each part is weakened, the one by the slot and the other by the sharp bend.

Having thus described my invention, what I claim as new, and desire to secure by Letters Patent, is—

1. A stove-pipe-joint fastener composed of a fixed projection upon each adjacent section of pipe, such projections having an enlarged head or terminus, and of a flexible wire wound upon such projections and held to place by such heads, and secured as shown and described.

2. The stove-pipe-joint fastener constructed as shown in Figs. 1 and 2 of the drawings, and as specified and described.

HENRY MARSHALL WELLS.

Witnesses:
 THOS. WOODBRIDGE,
 C. MACKENZIE.